US011393496B2

(12) United States Patent
Atitallah et al.

(10) Patent No.: US 11,393,496 B2
(45) Date of Patent: Jul. 19, 2022

(54) SELECTIVELY ACTIVATING MICROACTUATORS ON A HEAD GIMBAL ASSEMBLY

(71) Applicant: Seagate Technology LLC, Freemont, CA (US)

(72) Inventors: Hassene Atitallah, Eden Prairie, MN (US); Razman Zambri, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/062,293

(22) Filed: Oct. 2, 2020

(65) Prior Publication Data

US 2022/0108717 A1    Apr. 7, 2022

(51) Int. Cl.
*G11B 5/48* (2006.01)
*G11B 5/55* (2006.01)
*G11B 5/60* (2006.01)
*G11B 5/00* (2006.01)

(52) U.S. Cl.
CPC ............ *G11B 5/4826* (2013.01); *G11B 5/483* (2015.09); *G11B 5/4833* (2013.01); *G11B 5/4873* (2013.01); *G11B 5/5552* (2013.01); *G11B 5/6011* (2013.01); *G11B 2005/001* (2013.01)

(58) Field of Classification Search
None
See application file for complete search history.

(56) References Cited

U.S. PATENT DOCUMENTS

| | | | |
|---|---|---|---|
| 6,356,413 B2 | 3/2002 | Coon et al. | |
| 6,947,251 B1 | 9/2005 | Oveyssie et al. | |
| 7,715,150 B2 | 5/2010 | Strom et al. | |
| 8,289,652 B2 | 10/2012 | Zambri et al. | |
| 8,307,538 B2 | 11/2012 | Hata | |
| 9,390,738 B1 * | 7/2016 | Mendonsa | G11B 5/6088 |
| 9,437,234 B1 * | 9/2016 | Kim | G11B 20/18 |
| 10,056,108 B1 * | 8/2018 | Seng | G11B 5/09 |
| 10,431,257 B1 * | 10/2019 | Ehrlich | G11B 5/4873 |
| 2002/0154445 A1 | 10/2002 | Wada et al. | |
| 2003/0142448 A1 * | 7/2003 | Koganezawa | G11B 5/5552 360/294.4 |
| 2007/0258169 A1 * | 11/2007 | Lee | G11B 5/6005 360/234.1 |
| 2008/0007863 A1 * | 1/2008 | Kim | G11B 5/59627 360/77.04 |
| 2009/0034128 A1 | 2/2009 | Sharma et al. | |
| 2018/0040343 A1 * | 2/2018 | Ee | G11B 5/4873 |
| 2019/0180777 A1 * | 6/2019 | Shivarama | G11B 5/3163 |
| 2021/0012796 A1 * | 1/2021 | Miyamoto | G11B 5/4833 |
| 2021/0249040 A1 * | 8/2021 | Hahn | G11B 5/4813 |

* cited by examiner

Primary Examiner — Jefferson A Evans

(57) ABSTRACT

A head stack assembly for a hard disk drive includes a head gimbal assembly. The head gimbal assembly includes a slider, a plurality of microactuators, and a microactuator controller. The slider includes active components which are configured to perform drive operations in response to receiving control signals from a drive controller. The microactuators are configured to adjust the position of the slider relative to a magnetic disk during drive operations. The microactuator controller is configured to selectively couple the microactuators to a microactuator power source based on the control signals.

15 Claims, 4 Drawing Sheets

SELECTIVELY ACTIVATING MICROACTUATORS ON A HEAD GIMBAL ASSEMBLY

TECHNICAL FIELD

The disclosure relates to a head gimbal assembly for a hard disk drive.

BACKGROUND

Hard disk drives include a plurality of magnetic disks that store data and a head stack assembly (HSA) that includes a plurality of recording heads to read and write data from and to the magnetic disks. In one example, an HSA includes a plurality of head gimbal assemblies (HGAs) that each includes a respective slider and a plurality of microactuators. Each slider performs drive operations to read data from, write data to, and maintain data on the respective magnetic disks. In some examples, the microactuators provide finer resolution tracking of the respective slider while performing the drive operations. Typically, a microactuator power source provides power to all of the microactuators on all of the HGAs of the HSA simultaneously regardless of which slider(s) are performing drive operations.

SUMMARY

The present disclosure relates to techniques for selectively activating one or more sets of microactuators within a head gimbal assembly (HGA) of a hard disk drive (HDD). An example HDD includes a head stack assembly (HSA) that includes a plurality of HGAs. Each HGA of the plurality of HGAs includes a respective slider and at least one set of microactuators that provide refined positioning control of the slider. Each slider includes a plurality of active components (e.g., a writer, reader, and/or heater) that are controlled by control signals sent from a drive controller.

Each HGA includes a microactuator controller to selectively activate the set(s) of microactuators for that HGA. For example, the drive controller provides a control signal to an active component of a slider of a particular HGA. The microactuator controller of the particular HGA also receives the control signal and may couple a set of microactuators of the particular HGA to a microactuator power source in response to receiving the control signal from the drive controller. Coupling the set of microactuators of the particular HGA to the microactuator power source activates the set of microactuators by providing power to the set of microactuators. In contrast to some examples that provide power to all sets of microactuators on all of the HGAs of an HSA simultaneously, selectively activating a set of microactuators when activating an active component of a particular slider may reduce the total amount of power consumed by the microactuators of a HSA. That is, in some examples, techniques of this disclosure may activate some or all of the microactuators on an active HGA (e.g., an HGA that is actively performing a drive operation) and refrain from activating microactuators on other HGAs (e.g., HGAs that are not actively performing a drive operation), which may reduce the power consumed by the HDD.

In one example, a head stack assembly for a hard disk drive includes a slider including an active component configured to perform a drive operation in response to receiving a control signal from a drive controller, a set of microactuators configured to adjust a position of the slider relative to a magnetic disk during drive operations, and a microactuator controller configured to selectively couple the set of microactuators to a microactuator power source based on the control signal.

In one example, a method includes selectively coupling, by a first microactuator controller of a first head gimbal assembly of a head stack assembly of a hard disk drive, a first set of microactuators of the first head gimbal assembly to a microactuator power source, and selectively coupling, by a second microactuator controller of a second head gimbal assembly of the head stack assembly, a second set of microactuators of the second head gimbal assembly to the microactuator power source.

These and other features and aspects of various examples may be understood in view of the following detailed discussion and accompanying drawings.

DETAILED DESCRIPTION

Figure 1:
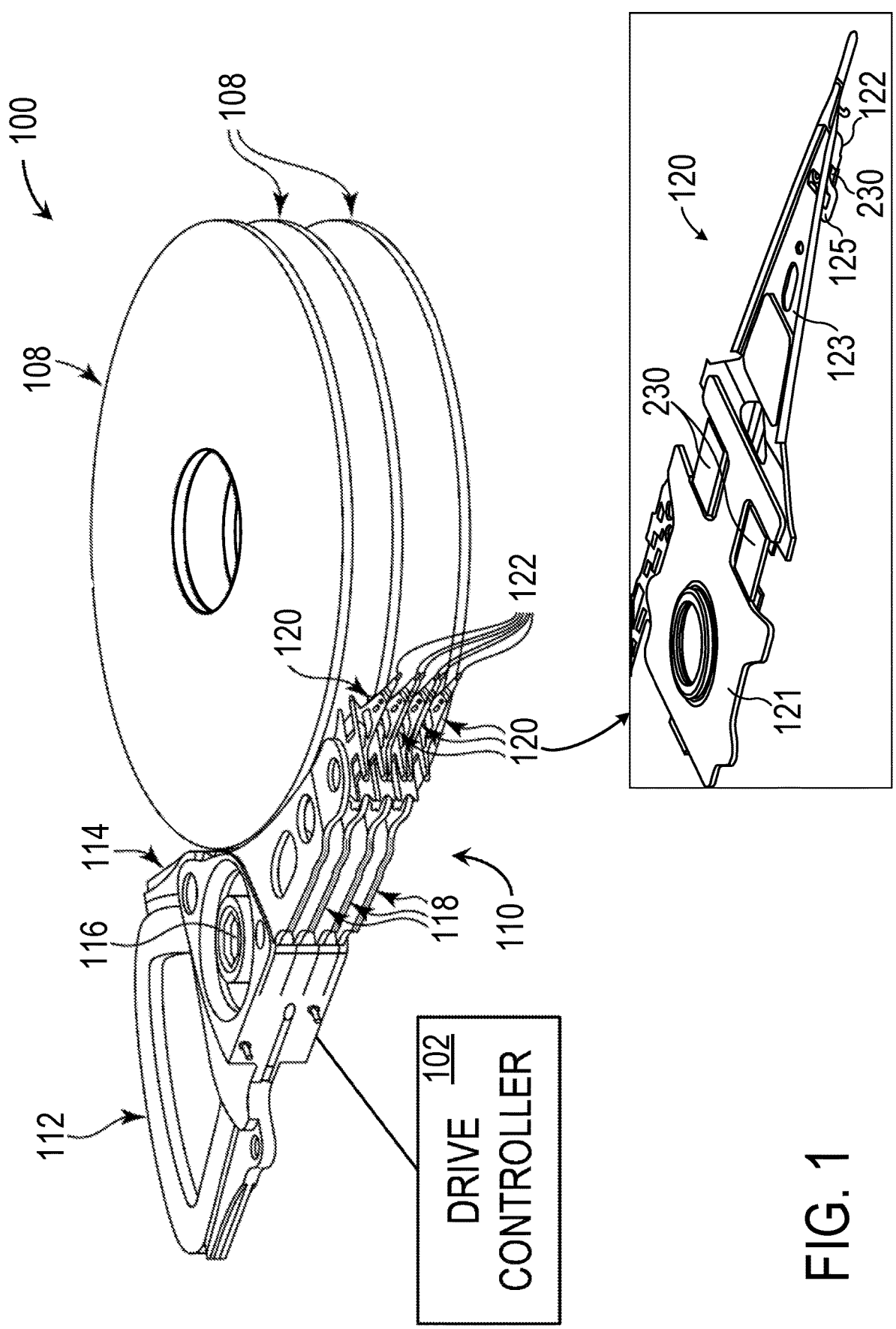
FIG. 1 is a perspective view of an example hard disk drive, in accordance with aspects of this disclosure.

FIG. 1 is a perspective view of an example hard disk drive (HDD), in accordance with aspects of this disclosure. HDD 100 includes a drive controller 102, one or more magnetic disks 108, and a head stack assembly (HSA) 110. HSA 110 includes a plurality of head gimbal assemblies (HGA) 120. Each HGA of HGAs 120 includes a respective slider 122. Each slider 122 includes a recording head (not shown). Each HGA 120 may include a flexure 125 configured to provide a surface for mounting a slider 122, a baseplate 121 configured to couple an HGA 120 to a rotatable drive actuator arm 118, and a load beam 123 configured exert a force on slider 122 and urge slider 122 toward a media surface. HDD 100 may include one or more sets of microactuators 230. A set of microactuators 230 may be located on various portions of an HGA 120, such as flexure 125, baseplate 121, and/or load beam 123.

Drive controller 102 is configured to control drive operations, such as read operations, write operations, heating operations, and data maintenance operations. For example, drive controller 102 receives commands (e.g., read commands and write commands) from a host device (not shown) and controls components of HDD 100 based on the commands. In some examples, drive controller 102 includes hardware, hardware and software, hardware and firmware, or a combination thereof suitable to perform the techniques attributed to drive controller 102. Examples of drive controller 102 include a digital signal processor (DSP), a processor or microprocessor, an application specific integrated circuit (ASIC), a field programmable gate array (FPGA), and a system on a chip (SoC), among others. While illustrated as a single controller, the functionality of drive controller 102 may in some examples be performed by a combination of controllers.

While not shown in FIG. 1, drive controller 102 may include tangible memory configured to store data, such as non-volatile memory (e.g., flash memory) or volatile memory (e.g., random access memory (RAM)). It should be understood, however, that memory does not include connections, carrier waves, signals, or other transient signal transport mechanisms, but are instead directed to non-transient, tangible memory. In some examples, the memory may be external to one or more controllers (e.g., may be external to a package in which one or more controllers are housed). The memory may store computer-executable instructions which may be executed by a processor to perform the functionality of the processor.

In some examples, drive controller 102 includes a servo controller. In one example, the servo controller controls voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA of HGAs 120, such that rotating actuator mechanism 114 causes rotatable drive actuator arms 118 and HGAs 120, and thus sliders 122, to move relative to magnetic disks 108.

Drive controller 102 may include read/write circuitry that is configured to control the recording heads of sliders 122. In some examples, read/write circuitry includes one or more channels and/or one or more preamps. Channels are configured to process and convert data between digital and analogue formats, and may include analog and digital circuitry such as digital-to-analog converters, analog-to-digital converters, detectors, timing-recovery units, error correction units, etc. Preamps are configured to control some parameters of the read operations, write operations, heating operations, and data maintenance operations that are related to the recording head, such as writer current, reader bias, heater power, and contact detection.

Each recording head of sliders 122 includes a plurality of active components that are configured to perform or assist in performing read operations and write operations. Examples of active components include a writer, a reader, and a heater (e.g., a read heater or a write heater). In some examples, a heater is configured to cause a writer or a reader to protrude from its respective slider 122 toward its respective media disk of magnetic disks 108.

Drive controller 102 outputs control signals to control the respective active components of sliders 122. In some examples, the active components are configured to activate in response to receiving the respective control signals. In one example, the control signal includes data to be written to one of magnetic disk 108 by a writer of a recording head associated with one of sliders 122. In another example, the control signal applies a bias to a reader of a recording head associated with one of sliders 122. In another example, the control signal activates a heater of a recording head associated with one of sliders 122 prior to and/or during read operations or write operation.

Figure 2:
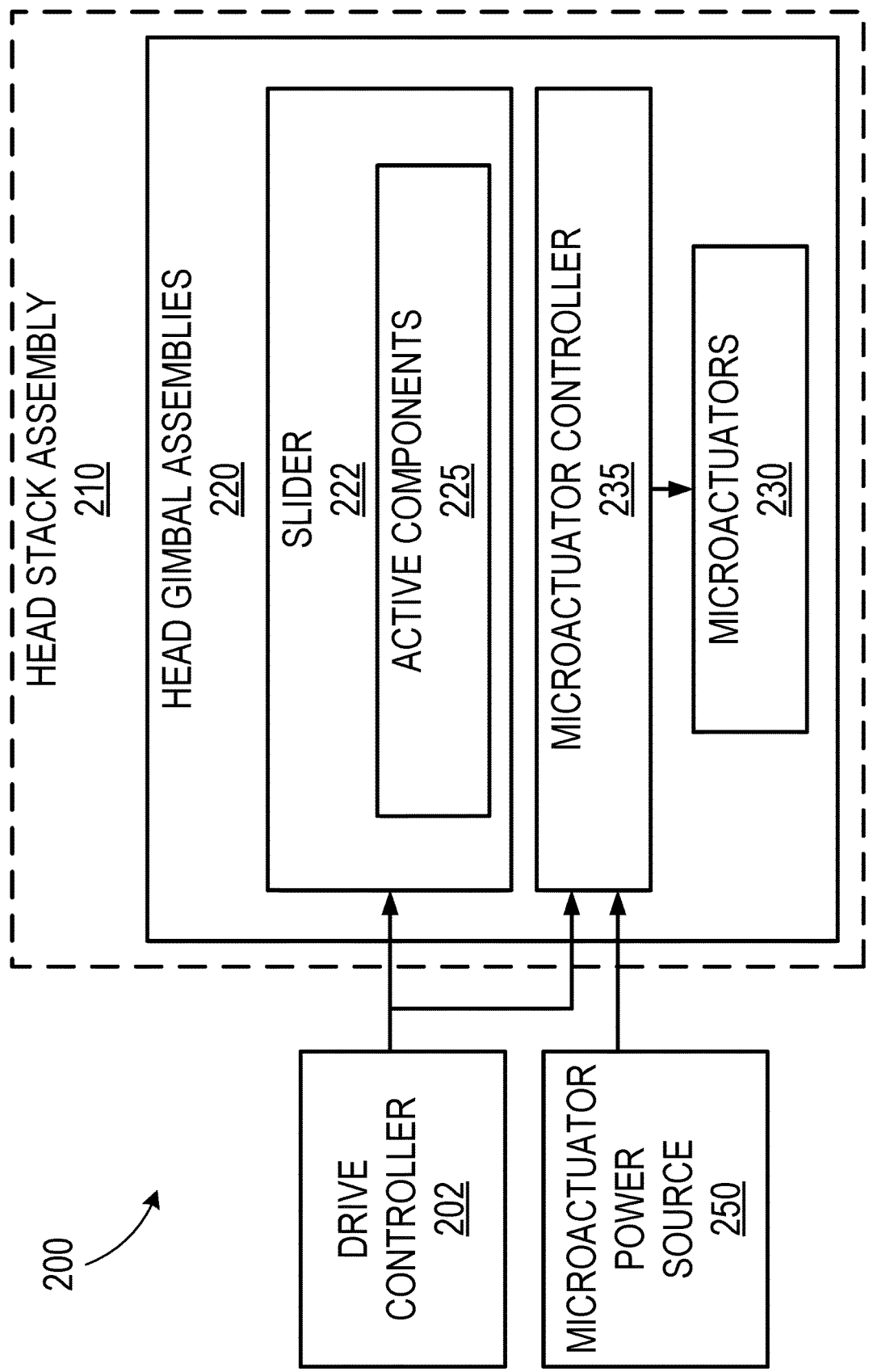
FIG. 2 is a block representation of an example hard disk drive, in accordance with aspects of this disclosure.

FIG. 2 is a block representation of an example hard disk drive, in accordance with aspects of this disclosure. HDD 200 may be an example of HDD 100 of FIG. 1. HDD 200 includes a drive controller 202, at least one HSA 210, and a microactuator power source 250. Each HSA 210 includes a plurality of HGAs 220. Each HGA 220 includes a slider 222, a plurality of microactuators 230, and a microactuator controller 235.

Each slider 222 includes active components 225 that are configured to perform drive operations in response to receiving control signals from drive controller 202. Examples of drive operations include write operations that write data to a magnetic disk, read operations that read data from a magnetic disk, and heating operations that assist with positioning writers and readers during write operations and read operations.

Each slider 222 is configured to maintain its active components 225 at a specified target distance from the surface of its respective magnetic disk while the active components 225 are performing drive operations. Examples of active components 225 include a writer, a reader, a heater (e.g., a writer heater and/or a reader heater), or other component that is configured to perform or assist in performing drive operations. A reader is configured to perform read operations and a writer is configured to perform write operations. In some examples, a heater performs a heating operation that heats a volume of slider 222 in proximity to the reader or writer to urge the reader or writer towards its respective magnetic disk.

Drive controller 202 is configured to control drive operations of active components 225 of sliders 222 of HGAs 220. In some examples, drive controller 202 includes one or more channels and/or one or more preamplifiers (also referred to as preamps). In some instances, channels are configured to process data and convert data between digital and analog formats. For instance, channels may include digital-to-analog converters, analog-to-digital converters, detectors, timing-recovery units, error correction units, etc. In one instance, preamps are configured to process data and control various parameters of the drive operations, such as writer current, reader bias, heater power, and contact detection.

In one example, drive controller 202 outputs a control signal to one or more of active components 225 of slider 222 in response to receiving a command from a host (not shown), which causes the active components 225 to perform the drive operations. Example control signals include a write control signal, a reader control signal, or a heater control signal (e.g., a write heater control signal and/or a read heater control signal). In some examples, each control signal is defined by a voltage or voltage range. For example, a writer control signal may have a voltage of 200 mV-300 mV. As another example, a reader control signal may have a voltage of 10 mV to 20 mV. In another example, a writer heater control signal or a reader heater control signal may have a voltage of 200 mV-2000 mV.

In one example, drive controller 202 sends a control signal to one of active components 225 of slider 222, causing that active component 225 to perform a drive operation. In another example, drive controller 202 sends a different control signal to a different active component of active components 225, causing the different active component 225 to perform a drive operation (e.g., different than the drive operation performed by another active component). In some examples, drive controller 202 sends a first control signal to a first active component 225, and sends a second control signal to a second active component 225 while still sending the first control signal. In other words, drive controller 202 may output multiple control signals simultaneously or sequentially.

In some examples, an active component 225 performs a drive operation in response to receiving a control signal from drive controller 202. In an example where active components 225 include a heater (e.g., reader heater or writer heater), the heater may perform a heating operation in response to receiving the control signal, which may urge another active component of active components 225 (e.g., a reader or writer) towards the magnetic disk. In an example where active components 225 include a writer, the writer may perform a write operation in response to receiving a control signal from drive controller 202. In an example where active components 225 include a reader, the reader may perform a read operation in response to receiving a command from drive controller 202.

Microactuators 230 are configured to adjust the position of slider 222 relative to a magnetic disk during drive operations. Microactuators 230 may be piezoelectric microactuators, and in some examples, may include lead zirconate titanate (PZT). Microactuators 230 are, in some scenarios, configured to activate (e.g., expand and contract) in response to receiving power from microactuator power source 250. Expansion and contraction of microactuators 230 adjusts the position of slider 222 relative to the magnetic disk. In contrast to the positioning of slider 222 provided by a voice coil drive actuator (e.g., voice coil drive actuator 112 of FIG. 1), microactuators 230 may, in some scenarios, provide finer resolution positioning of slider 222 relative to the magnetic disk, which may provide more accurate position of slider 222 relative to the magnetic disk and higher areal density capability of HDD 200.

HDD 200 may include one or more sets of microactuators 230. A set of microactuators 230 may be located on parts of an HGA 220 such as a flexure, a baseplate, or a load beam. In some examples, each HGA 220 includes multiple sets (e.g., pairs) of microactuators 230 at different locations on HGA 220. In some examples, microactuators 230 include a pair of microactuators proximal to slider 222 (e.g., on the flexure), a pair of microactuators located on an area of HGA 220 that is proximal to a drive actuator arm (e.g., on the baseplate), or a combination thereof.

Microactuator power source 250 is configured to supply power to microactuators 230. Examples of microactuator power sources 250 include a battery, power supply unit, or other power source. In some examples, microactuator power source 250 includes circuitry that transforms one or more characteristics of the power (e.g., voltage, current, frequency, and/or phase) from one value to another value prior to supplying the power to microactuators 230. In some examples, microactuator power source 250 outputs power defined by different characteristics. For example, microactuator power source 250 may output power defined by a first voltage or a first voltage range (e.g., approximately −10V to approximately +30V) to a first set of microactuators 230 (e.g., disposed on the baseplate) and power defined by a second voltage or a second voltage range (e.g., approximately −20V to approximately +20V) to a second set of microactuators 230 (e.g., disposed on the flexure).

In accordance with techniques of this disclosure, each HGA 220 includes a microactuator controller 235 configured to selectively couple a set of microactuators 230 to microactuator power source 250. Microactuator controller 235 may include a processor or microprocessor, an application specific integrated circuit (ASIC), a field programmable gate array (FPGA), or a system on a chip (SoC), among others. Microactuator controller 235 may include one or more switching devices which are configured to electrically couple a set or multiple sets of microactuators 230 to microactuator power source 250. Examples of switching devices include field effect transistors (FETs), micro-electromechanical systems (MEMS) switches, relay switches, or other suitable switching components.

Microactuator controller 235 determines whether to couple a set of microactuators 230 to microactuator power source 250 based on one or more control signals received from drive controller 202. In some examples, microactuator controller 235 electrically couples a set of microactuators 230 to microactuator power source 250 in response to receiving a control signal or a combination of control signals (e.g., a heater control signal, a writer control signal, a reader heater control signal plus a reader signal) from drive controller 202. In one example, microactuator controller 235 receives a plurality of control signals and electrically couples a set of microactuators 230 to microactuator power source 250 in response to receiving any control signal from the plurality of control signals. In one example, microactuator controller 235 electrically couples a set of microactuators 230 to microactuator power source 250 by closing a switching device.

In some scenarios, microactuator controller 235 electrically couples a set of microactuators 230 to microactuator power source 250 based on a voltage of a control signal from drive controller 202. In some examples, microactuator controller 235 may determine whether a voltage of the control signal satisfies (e.g., is greater than or equal to) a threshold voltage (or is outside a predetermined voltage range). In one example, microactuator controller 235 couples a set of microactuators 230 to microactuator power source 250 in response to determining that the voltage of the control signal satisfies the threshold voltage or is within the predetermined voltage range. In one example, microactuator controller 235 refrains from electrically coupling the set of microactuators 230 to microactuator power source in response to determining that the voltage of the control signal does not satisfy the threshold voltage or is outside a predetermined voltage range. For example, microactuator controller 235 may electrically couple a set of microactuators 230 to microactuator power source 250 when a voltage of the control signal is greater than or equal to the threshold voltage. In other examples, microactuator controller 235 electrically couples a set of microactuators 230 to microactuator power source 250 when the voltage of the control signal is less than the threshold voltage. In some examples, microactuator controller 235 electrically couples a set of microactuators 230 to microactuator power source 250 when a voltage of the control signal is within a predefined voltage range (e.g., above a first voltage threshold and below a second voltage threshold).

In some examples, microactuator controller 235 isolates a set of microactuators 230 from microactuator power source 250 in the absence of a control signal. For example, microactuator controller 235 may terminate the coupling of a set of microactuators 230 from microactuator power source 250 in response to ceasing to receive the control signal. In another example, if a particular set of microactuators 230 is not coupled to microactuator power source 250, microactuator controller 235 may refrain from coupling the particular set of microactuators 230 to microactuator power source 250 in the absence of a control signal. A set of microactuators 230 which is not coupled to microactuator power source 250 is electrically isolated from microactuator power source 250. Electrically isolating a set of microactuators 230 from microactuator power source 250 inactivates the set of microactuators 230, such that the set of microactuators 230 does not consume power from microactuator power source 250. In one example, microactuator controller 235 electrically isolates a set of microactuators 230 from microactuator power source 250 by opening (or keeping open) a switching device in the absence of a control signal.

In this way, microactuator controller 235 electrically couples a set of microactuators 230 to microactuator power source 250 when receiving a control signal from drive controller 202 and electrically isolates the set of microactuators 230 from microactuator power source 250 when not receiving the control signal from drive controller 202. In other words, microactuator controller 235 activates microactuators 230 on a particular HGA 220 when drive controller 202 sends a control signal to an active component 225 of the respective slider 222 of the HGA 220 and refrains from activating microactuators 230 on a particular HGA 220 in the absence of one of specific control signals or one of specific combinations of control signals sent by drive controller 202 to an active component 225 of the respective slider 222 of the HGA 220. Thus, microactuators 230 on the particular HGA 220 may consume power when the slider 222 on the particular HGA 220 is performing a drive operation and may refrain from consuming power when the slider 222 on the particular HGA 220 is not performing a drive operation.

In some examples, a first microactuator controller 235 of a first HGA 220 couples a first set of microactuators 230 of the first HGA 220 to microactuator power source 250 and a second microactuator controller 235 of a different, second HGA 220 isolates a second set of microactuators of a second HGA 220 from the microactuator power source 250. For example, drive controller 202 may output a control signal to an active component 225 of the first HGA 220 and refrain from outputting the control signal to an active component of another HGA 220. In one example, the first microactuator controller 235 receives the control signal from drive controller 202 and couples the first set of microactuators 230 of the first HGA 220 to microactuator power source 250. In such examples, the second microactuator controller 235 of the second HGA 220 does not receive the control signal and isolates the second set of microactuators 230 of the second HGA 220 from microactuator power source 250 in the absence of the control signal. In this way, in some examples, microactuators 230 on one HGA 220 are powered (e.g., activated) while microactuators 230 on another HGA 220 are not powered (e.g., not activated). In contrast to example HDDs where all of the microactuators on each of the HGAs consume power from a microactuator power source even when some sliders are not performing drive operations, coupling a set of microactuators 230 on a first HGA 220 to microactuator power source 250 when an active component 225 of a first slider 222 of the first HGA 220 is performing a drive operation and refraining from coupling a set of microactuators 230 on a second HGA 220 to microactuator power source 250 when active components 225 of a second slider 222 of the second HGA 220 are not performing drive operations may reduce the power consumed by HDD 200. That is, powering microactuators 230 on one HGA when the active components of a slider on that HGA are performing a drive operation and refraining from powering microactuators 230 on other, different HGAs 220 when the active components of sliders on the other, different HGAs 220 are not performing a drive operation may reduce the power consumed by HDD 200.

In some examples, microactuator controller 235 couples multiple sets of microactuators 230 on the same HGA 220 to microactuator power source 250 in response to receiving a control signal from drive controller 202. For example, microactuator controller 235 may couple a first set of microactuators 230 on one HGA 220 (e.g., disposed on the flexure) and a second set of microactuators 230 on the same HGA 220 (e.g., disposed on the load beam) to microactuator power source 250 in response to receiving a control signal (e.g., a heater control signal or a writer control signal).

In some instances, microactuator controller 235 couples different sets of microactuators 230 on the same HGA 220 to microactuator power source 250 based on different control signals from drive controller 202. In one instance, microactuator controller 235 couples a first set of microactuators 230 on an HGA 220 (e.g., disposed on the flexure) to microactuator power source 250 in response to receiving a first control signal (e.g., a writer heater control signal or a reader heater control signal) from drive controller 202 and couples a second set of microactuators 230 on the same HGA 220 (e.g., disposed on the load beam) to microactuator power source 250 in response to receiving a second, different control signal (e.g., a reader control signal) from drive controller 202.

Microactuator controller 235 may, in some examples, couple multiple sets of microactuators 230 on one HGA 220 to microactuator power source 250 based on combinations of control signals received from drive controller 202. In one example, microactuator controller 235 couples a first set of microactuators 230 (e.g., disposed on the load beam) to microactuator power source 250 in response to receiving a first control signal (e.g., a reader heater control signal) from drive controller 202, and couples a second set of microactuators 230 (e.g. disposed on the flexure) to microactuator power source 250 in response to receiving both the first control signal and a second, different control signal (e.g., a reader signal).

Microactuator controller 235 may couple different sets of microactuators 230 on an HGA 220 to different outputs of microactuator power source 250. In some scenarios, microactuator controller 235 couples a first set of microactuators 230 to a first output of microactuator power source 250 (e.g., that outputs power defined by a first characteristic, such as a first voltage or voltage range) and couples a second set of microactuators 230 to a second, different output of microactuator power source 250 (e.g., that outputs power defined by a second characteristic, such as a second voltage or voltage range). In such scenarios, microactuator controller 235 may couple different sets of microactuators 230 on a single HGA 220 to different outputs of microactuator power source 250 by closing different switching devices of microactuator controller 235. In other words, microactuator controller 235 may close a first switching device to couple the first set of microactuators 230 to the first output of microactuator power source 250 and close a second switching device to couple the second set of microactuators 230 to the second, different output of microactuator power source 250.

Figure 3:
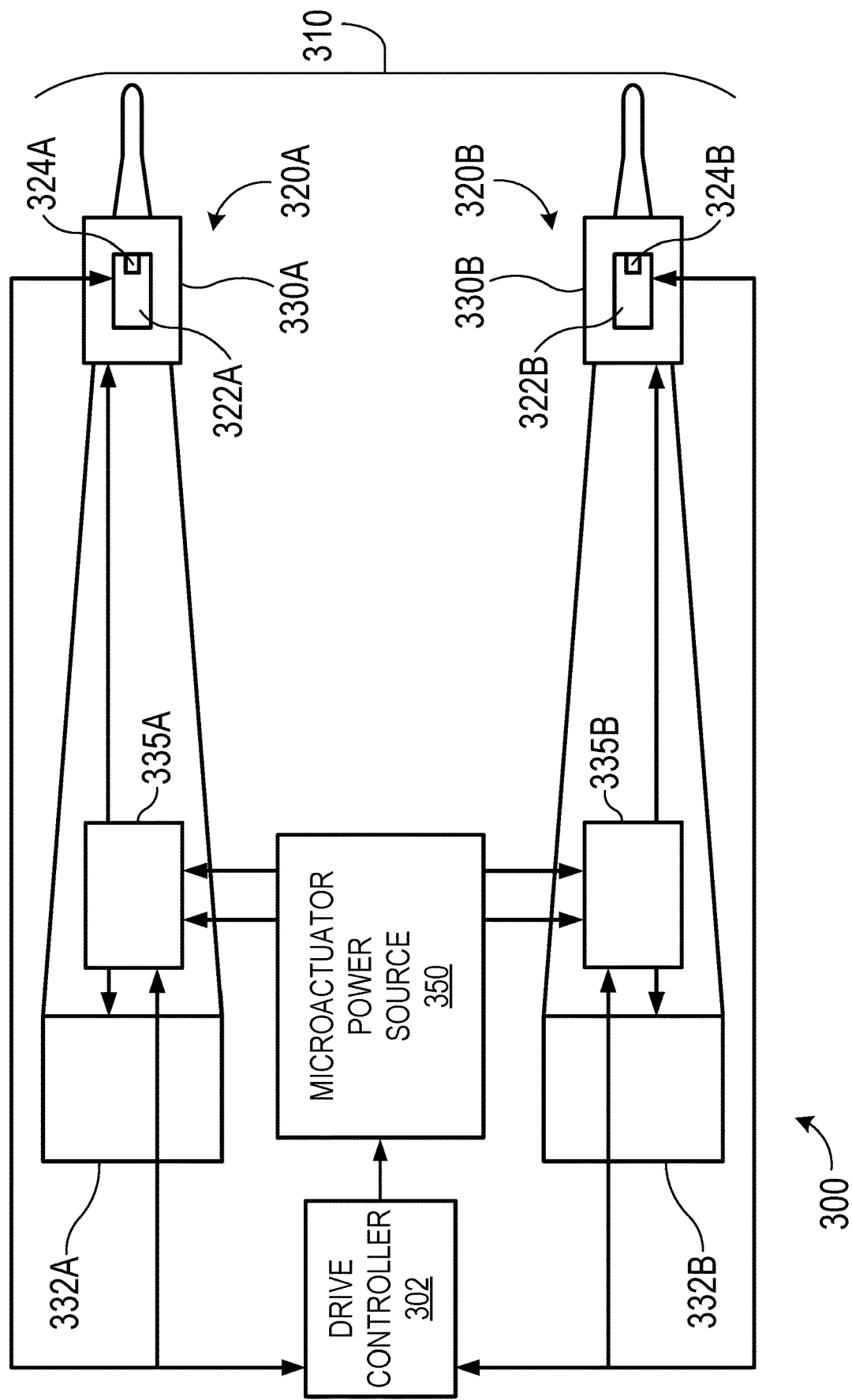
FIG. 3 is a block representation of an example hard disk drive, in accordance with aspects of this disclosure.

FIG. 3 is a block representation of an example hard disk drive, in accordance with aspects of this disclosure. HDD 300 may be an example of HDD 100 or HDD 200 of FIGS. 1 and 2, respectively. HDD 300 includes a drive controller 302, a microactuator power source 350, and an HSA 310. HSA 310 includes a first HGA 320A and a second HGA 320B. HGA 320A includes a slider 322A, a set of microactuators 330A, a set of microactuators 332A, and a microactuator controller 335A. Similarly, HGA 320B includes a slider 322B, a set of microactuators 330B, a set of microactuators 332B, and a microactuator controller 335B. Sliders 322A and 322B include active components 324A and 324B, respectively.

In some examples, drive controller 302 receives a first command from a host (not shown). The first command may cause drive controller 302 to initiate a drive operation (e.g., a read operation, a write operation) to be completed by HGA 320A. Drive controller 302 outputs a first control signal (e.g., a reader control signal, a writer control signal, or a heater control signal) in response to receiving the first command. In some scenarios, drive controller 302 outputs the first control signal to microactuator controller 335A and an active component 324A of slider 322A of HGA 320A. In other scenarios, drive controller 302 outputs the first control signal to microactuator controller 335A and active component 324A of slider 322A of HGA 320A and refrains from sending other control signals to microactuator controller 335B and active components 324B of slider 322B of HGA 320B. In one example, active component 324A of slider 322A receives the first control signal and performs a drive operation in response to receiving the first control signal.

Drive controller 302 may output more than one control signal in response to receiving the first command from the host. In some scenarios, drive controller 302 outputs more than one control signal to microactuator controller 335A and one or more active components 324A of slider 322A. In one scenario, drive controller 302 outputs a first control signal and a second control signal to microactuator controller 335A and a first active component 324A of slider 322A (e.g. a first write control signal and a second write control signal sent to a writer). In another scenario, drive controller 302 outputs a first control signal (e.g., a writer heater control signal, a reader heater control signal) to microactuator controller 335A and the first active component 324A of slider 322A (e.g., a writer heater, a reader heater) and a second control signal (e.g., a writer control signal, a reader control signal) to microactuator controller 335A and a second active component 324A of slider 322A (e.g., a writer or a reader). In one scenario, drive controller 302 sends a first control signal to microactuator controller 335A and an active component 324A of slider 322A of HGA 320A and a second control signal to microactuator controller 335B and an active component 324B of slider 322B of HGA 320B. Drive controller 302 may send the first control signal and the second control signal sequentially or simultaneously.

Drive controller 302 may receive an additional command from the host and output additional control signals in response to receiving the additional command. In some examples, drive controller 302 ceases outputting a first control signal and/or second control signal which was initiated by a first command from the host upon receiving the additional command from the host. In some examples, drive controller 302 outputs an additional control signal to microactuator controller 335B and an active component 324B of slider 322B of HGA 320B in response to receiving the additional command. In one example, drive controller 302 outputs the additional control signal to microactuator controller 335B and active component 324B of slider 322B of HGA 320B after outputting another control signal to microactuator controller 335A and an active component 324A of slider 322A of HGA 320A. Active component 324B of slider 322B may perform a drive operation in response to receiving the additional control signal.

In some examples, microactuator controller 335A couples microactuators 330A and/or microactuators 332A to microactuator power source 350 upon receiving a first control signal and/or a second control signal from drive controller 302. In one example, microactuator controller 335A couples microactuators 330A to microactuator power source 350 in response to receiving the first control signal. In another example, microactuator controller 335A couples microactuators 332A to microactuator power source 350 in response to receiving the second control signal. Microactuator controller 335A may couple microactuators 330A and 332A to microactuator power source 350 at the same time or at different times.

Microactuator controller 335A may couple multiple sets of microactuators (e.g. microactuators 330A and microactuators 332A) to microactuator power source 350 upon receiving a control signal (e.g., a reader control signal, a writer heater control signal). In one scenario, microactuator controller 335A couples microactuators 330A and/or 332A to microactuator power source 350 in response to receiving a first control signal and refrains from coupling microactuators 330A and/or 332A to microactuator power source 350 upon receiving a second, different control signal or in the absence of any control signals.

Microactuator controller 335A may, in some scenarios, couple microactuators 330A and/or microactuators 332A to microactuator power source 350 in response to receiving a combination of control signals. In one example, microactuator controller 335A couples microactuators 330A to microactuator power source 350 in response to receiving a first control signal and a second control signal (e.g., a writer heater control signal and a writer control signal). In another example, microactuator controller 335A couples microactuators 330A to microactuator power source 350 in response to receiving a first control signal (e.g., a reader heater control signal) and couples microactuators 332A to microactuator power source 350 in response to receiving the first control signal and a second control signal (e.g. the reader heater control signal and a reader control signal). In other words, microactuator controller 335A couples microactuators 330A to microactuator power source 350 and refrains from coupling microactuators 332A to microactuator power source 350 upon receiving the first control signal, and couples microactuators 330A and microactuators 332A to microactuator power source 350 in response to receiving the first control signal and the second control signal.

In some instances, microactuator controller 335A couples microactuators 330A and/or 332A of HGA 320A to microactuator power source 350 in response to receiving a control signal, and microactuator controller 335B isolates microactuators 330B and 332B of HGA 320B from microactuator power source 350 in the absence of a control signal. In other instances, microactuator controller 335B couples microactuators 330B and/or 332B of HGA 320B to microactuator power source 350 in response to receiving a control signal, and microactuator controller 335A isolates microactuators 330A and 332A of HGA 320A from microactuator power source 350 in the absence of a control signal. In one example, drive controller 302 sends a first control signal to microactuator controller 335A and an active component 324A of slider 322A of HGA 320A, stops sending the first control signal, then sends a second control signal to microactuator controller 335B and an active component 324B of slider 322B of HGA 320B. In this example, microactuator controller 335A couples microactuators 330A and/or microactuators 332A to microactuator power source 350 as drive controller 302 is sending the first control signal, microactuator controller 335A isolates microactuators 330A and/or microactuators 332A from microactuator power source 350 when drive controller stops sending the first control signal, and microactuator controller 335B couples microactuators 330B and/or microactuators 332B to microactuator power source 350 as drive controller 302 is sending the second control signal.

In contrast to example HDDs on which all sets of microactuators on a particular HGA are coupled to a microactuator power source regardless of whether one or more control signals are being sent to active components of the slider of the particular HGA, the use of a microactuator controller to selectively couple specific sets of microactuators to the microactuator power source based on a specific control signal or specific control signals may reduce the power consumed by microactuators of an HDD.

Figure 4:
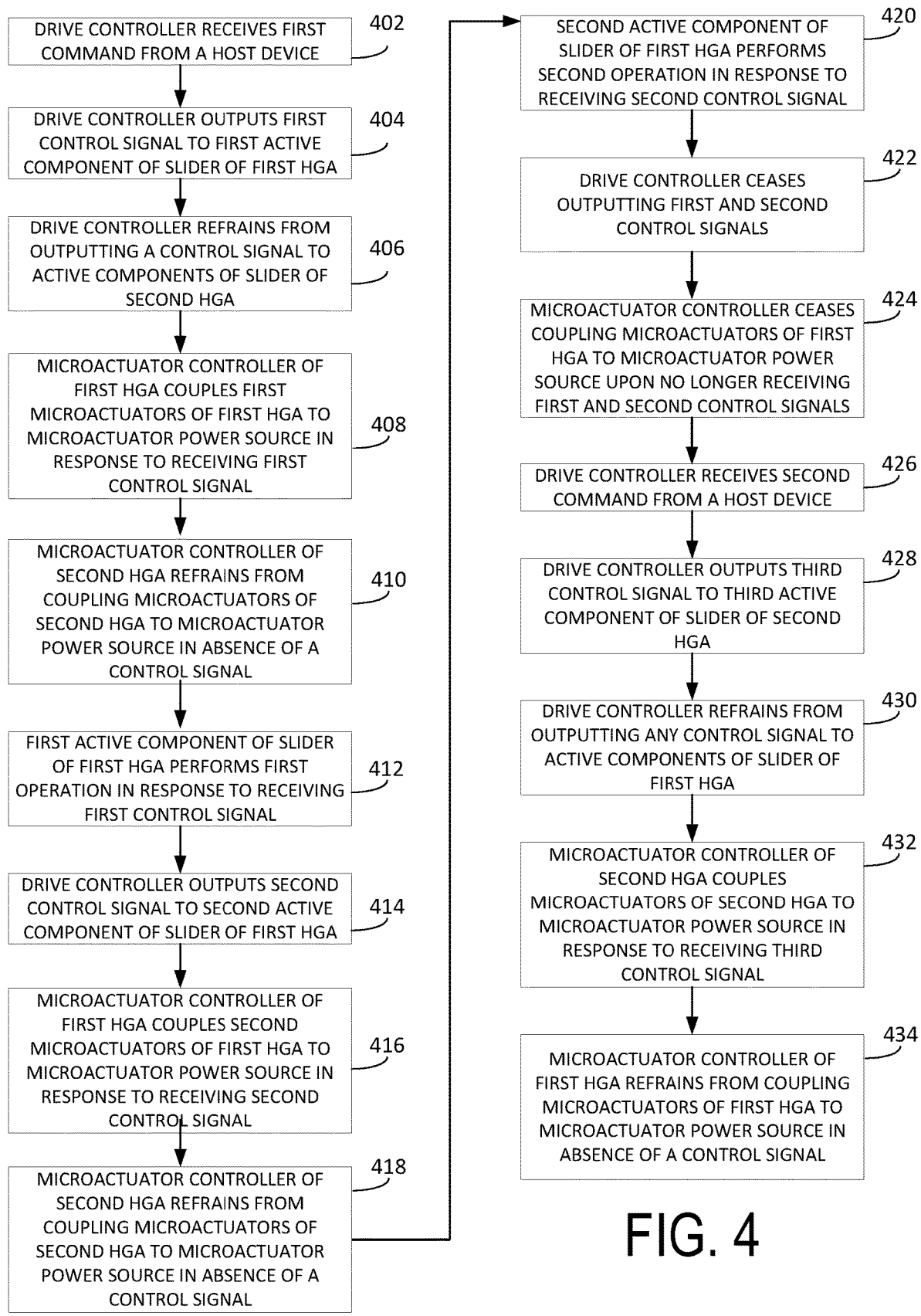
FIG. 4 is a flow diagram illustrating example operations of an example controller configured to control an example hard disk drive, in accordance with aspects of this disclosure.

FIG. 4 is a flowchart illustrating example operations performed by a hard disk drive, in accordance with aspects of this disclosure. FIG. 4 is described with reference to HDD 300 of FIG. 3.

Drive controller 302 of HDD 300 receives a first command (e.g., a read command or a write command) from a host device (402). Drive controller 302 outputs a first control signal (e.g. a writer control signal, a reader control signal, or a heater control signal) to a first active component 324A of slider 322A of HGA 320A in response to receiving the first command from the host device (404). In the example of FIG. 4, drive controller 302 refrains from outputting a control signal to active components 324B of slider 322B of second HGA 320B (406).

Microactuator controller 335A couples microactuators 330A to microactuator power source 350 in response to receiving the first control signal (408). For example, microactuator controller 335A may close a switching device to couple microactuators 330A to microactuator power source 350. In one example, microactuator controller 335A refrains from coupling second set of microactuators 332A to microactuator power source 350 while receiving the first control signal. For example, microactuator controller 335A may refrain from closing a switch to isolate microactuators 332A from microactuator power source 350.

Coupling microactuators 330A to microactuator power source 350 supplies power to microactuators 330A, thereby activating microactuators 330A. When activated, microactuators 330A adjust a position of slider 322A relative to a first magnetic disk of HDD 300. For example, supplying power to microactuators 330A causes microactuators 330A to expand and contract to adjust the position of slider 322A relative to the first magnetic disk.

In some examples, microactuator controller 335B of second HGA 320B does not receive the first control signal from drive controller 302. In such examples, microactuator controller 335B refrains from coupling microactuators 330B and 332B of HGA 320B to microactuator power source 350 in the absence of a control signal from drive controller 302 (410). That is, microactuator controller 335B isolates microactuators 330B and 332B from microactuator power source 350 when microactuator controller 335B does not receive a control signal. In this way, techniques of this disclosure may reduce the amount of power consumed by microactuators 330B and 332B by isolating microactuators 330B and 332B from microactuator power source 350 when active components 324B are not active (e.g., when active components 324B of slider 322B are not performing drive operations).

The active component 324A of slider 322A performs an operation in response to receiving the first control signal (412). For example, active component 324A may perform a heater operation, a write operation, or a read operation.

Drive controller 302 may output a second control signal (e.g., different than the first control signal) to a second active component 324A of slider 322A of first HGA 320A (414). Drive controller 302 may output the second control signal in response to first active component 324A completing the first drive operation or at approximately the same time as it is outputting the first control signal. In one example, drive controller 302 continues to refrain from outputting a control signal to active components 324B of slider 322B of HGA 320B.

In the example of FIG. 4, microactuator controller 335A couples microactuators 332A of first HGA 320A to microactuator power source 350 in response to receiving the second control signal from drive controller 302 (416). In one example, microactuator controller 335A couples microactuators 332A to microactuator power source 350 in response to receiving the first control signal and second control signal. Coupling microactuators 332A to microactuator power source 350 supplies power to microactuators 332A, thereby activating microactuators 332A. When activated, microactuators 332A adjust a position of slider 322A relative to the first magnetic disk of HDD 300.

In some scenarios, microactuator controller 335B of second HGA 320B does not receive the second control signal from drive controller 302. In such scenarios, microactuator controller 335B refrains from coupling microactuators 330B and 332B of HGA 320B to microactuator power source 350 in the absence of receiving a control signal (418). In this way, microactuator controller 335B isolates microactuators 330B and 332B from microactuator power source 350 such that microactuators 330B and 332B do not consume power.

The second active component 324A of slider 322A first HGA 320A performs a second operation in response to receiving the second control signal from drive controller 302 (420). For example, the second active component 324A may perform a drive operation different than the drive operation performed by the first active component 324A.

Drive controller 302 ceases outputting the first control signal and second control signal to active components of slider 322A of first HGA 320A (422). In some examples, drive controller 302 ceases outputting the first control signal upon completion of the first operation and ceases outputting the second control signal upon completion of the second operation. First active components 324A may complete the first operation before the second active components 324A complete the second operation (or vice versa), or the first and second active components may complete the first and second operations at approximately the same time.

Microactuator controller 335A ceases coupling microactuators of HGA 320A to microactuator power source 350 upon no longer receiving the first control signal and second control signal (424). For example, when drive controller 302 ceases outputting the first control signal and continues outputting the second control signal, sets of microactuators which microactuator controller 335A coupled to microactuator power source 350 in response to receiving the first control signal will no longer be coupled to microactuator power source 350 by microactuator controller 335A. Sets of microactuators which microactuator controller 335A coupled to microactuator power source 350 in response to receiving the second control signal will continue to be coupled to microactuator power source 350 as long as drive controller 302 is still outputting the second control signal.

In other examples, drive controller 302 ceases outputting the second control signal while continuing to output the first control signal. In these examples, sets of microactuators which microactuator controller 335A coupled to microactuator power source 350 in response to receiving the second control signal will no longer be coupled to microactuator power source 350 by microactuator controller 335A. Sets of microactuators which microactuator controller 335A coupled to microactuator power source 350 in response to receiving the first control signal will continue to be coupled to microactuator power source 350 as long as drive controller 302 is still outputting the first control signal.

In other examples, drive controller 302 ceases outputting the first control signal and second control signal simultaneously. Sets of microactuators which microactuator controller 335A coupled to microactuator power source 350 in response to receiving the first control signal or the second control signal will cease being coupled to microactuator power source 350 by microactuator controller 335A.

In the example of FIG. 4, drive controller 302 receives a second command from a host device (426). Drive controller 302 outputs a third control signal (e.g. a writer control signal, a reader control signal, a heater control signal) to a first active component 324B of slider 322B of second HGA 320B in response to receiving the second command from the host device (428). Drive controller 302 refrains from outputting any control signal to active components of slider 322A of first HGA 320A (430).

Microactuator controller 335B of second HGA 320B receives the third control signal from drive controller 302. Microactuator controller 335B couples one or more sets of microactuators of second HGA 320B to microactuator power source 350 upon receiving the third control signal from drive controller 302 (432). Coupling microactuators of second HGA 320B to microactuator power source 350 supplies power to microactuators of second HGA 320B, thereby activating microactuators of second HGA 320B. When activated, microactuators of second HGA 320B adjust a position of slider 322B relative to a second magnetic disk of HDD 300. In one example, microactuator controller 335B couples first set of microactuators 330B of second HGA 320B to microactuator power source 350 and refrains from coupling second set of microactuators 332B of second HGA 320B to microactuator power source 350 in response to receiving the third control signal. In another example, microactuator controller 335B couples second set of microactuators 332B to microactuator power source 350 and refrains from coupling first set of microactuators 330B to microactuator power source 350 in response to receiving the third control signal. In another example, microactuator controller 335B couples first set of microactuators 330B and second set of microactuators 332B to microactuator power source 350 in response to receiving the third control signal. In another example, microactuator controller 335B refrains from coupling first set of microactuators 330B and second set of microactuators 332B to microactuator power source 350 in response to receiving the third control signal. In another example, microactuator controller 335B refrains from coupling any microactuators of second HGA 320B to microactuator power source 350 in response to receiving the third control signal.

Microactuator controller 335A of first HGA 320A does not receive the third control signal from drive controller 302. Microactuator controller 335A refrains from coupling any microactuators of first HGA 320A to microactuator power source 350 in response to receiving no control signal from drive controller 302 (434). Microactuators of first HGA 320A which are not coupled to microactuator power source 350 by microactuator controller 335A are electrically isolated from microactuator power source 350 and do not consume power.

The first active component 324B of slider 322B of second HGA 320B performs a third operation in response to receiving the third control signal from drive controller 302. Examples of a third operation include a heater operation, a write operation, and a read operation.

Drive controller 302 may output additional control signals causing the active components 324B of HGA 320B to perform additional drive operations. Drive controller 302 may output the additional control signals in response to first active components 324B of HGA 320B performing drive operations or while first active components 324B of HGA 320B perform drive operations. Drive controller 302 may cease outputting the control signals to active components 324B of HGA 320B. Microactuator controller 335B may isolate microactuators 330B and 332B from microactuator power source 350 when not receiving a control signal.

Various examples have been presented for the purposes of illustration and description. These and other examples are within the scope of the following claims.

What is claimed is:

1. A head stack assembly for a hard disk drive, the head stack assembly including:
   a first head gimbal assembly and a second head gimbal assembly, the first and second head gimbal assemblies each comprising:
      a slider comprising an active component configured to perform a drive operation in response to receiving a control signal from a drive controller;
      a set of microactuators configured to adjust a position of the slider relative to a magnetic disk during drive operations; and
      a microactuator controller configured to selectively couple the set of microactuators to a microactuator power source based on the control signal,
   wherein the microactuator controller of the first head gimbal assembly couples the set of microactuators of the first head gimbal assemble to a microactuator power source in response to receiving the control signal from the drive controller, and
   wherein the microactuator controller of the second head gimbal assembly isolates the set of microactuators of the second head gimbal assembly from the microactuator power source while the microactuator controller of the first head gimbal assembly couples the set of microactuator controllers of the first head gimbal assembly to the power source.

2. The head stack assembly of claim 1, wherein the active components of the slider of the first head gimbal assembly and the slider of the second head gimbal assembly each comprise a writer, a reader, a writer heater, or a reader heater.

3. The head stack assembly of claim 1, wherein the drive operation comprises a write operation, a read operation, or a heating operation.

4. The head stack assembly of claim 1,
   the first head gimbal assembly and the second head gimbal assembly each further comprising a flexure, a baseplate, and a load beam,
   wherein the set of microactuators of the respective head gimbal assembly is located on one of the flexure, the baseplate, or the load beam.

5. The head stack assembly of claim 1,
   wherein the set of microactuators of the first head gimbal assembly is a first set of microactuators,
   wherein the first head gimbal assembly includes a second set of microactuators, and
   wherein the microactuator controller of the first head gimbal assembly is further configured to selectively couple the second set of microactuators of the first head gimbal assembly to the microactuator power source.

6. The head stack assembly of claim 5, wherein the microactuator controller of the first head gimbal assembly is further configured to selectively couple the second set of microactuators of the first head gimbal assembly to the microactuator power source by electrically coupling the second set of microactuators of the first head gimbal assembly to the microactuator power source in response to receiving the control signal.

7. The head stack assembly of claim 5, wherein the control signal is a first control signal and wherein the microactuator controller of the first head gimbal assembly is further configured to:

refrain from electrically coupling the second set of microactuators of the first head gimbal assembly to the microactuator power source while the microactuator controller of the first head gimbal assembly is receiving the first control signal;
receive a second control signal from the drive controller; and
electrically couple the second set of microactuators of the first head gimbal assembly to the microactuator power source in response to receiving the second control signal.

8. The head stack assembly of claim 5, wherein the microactuator controller of the first head gimbal assembly is configured to selectively couple the first set of microactuators of the first head gimbal assembly to a first output of the microactuator power source and selectively couple the second set of microactuators of the first head gimbal assembly to a second output of the microactuator power source.

9. The head stack assembly of claim 1,
wherein the control signal is defined by a voltage, and
wherein the microactuator controller of the first head gimbal assembly is configured to selectively couple the set of microactuators of the first head gimbal assembly to the microactuator power source by:
electrically coupling the set of microactuators of the first head gimbal assembly to the microactuator power source in response to determining that the voltage satisfies a threshold voltage, and
refraining from electrically coupling the set of microactuators of the first head gimbal assembly to the microactuator power source in response to determining that the voltage does not satisfy the threshold voltage.

10. A method comprising:
receiving, by a drive controller of the hard disk drive, a command from a host device, wherein the command is a read command or a write command;
outputting, by the drive controller, a control signal causing an active component of a first slider of a first head gimbal assembly to perform a drive operation in response to receiving the first control signal;
refraining from outputting, by the drive controller, the control signal to an active component of a second slider of a second head gimbal assembly while the active component of the first head gimbal assembly performs the first drive operation;
coupling, by a first microactuator controller of the first head gimbal assembly, a set of microactuators of the first head gimbal assembly to a microactuator power source in response to receiving the control signal; and
isolating, by a second microactuator controller of the second head gimbal assembly of the head stack assembly, a set of microactuators of the second head gimbal assembly to the microactuator power source while the first microactuator controller receives the control signal and the second microactuator controller does not receive the control signal.

11. The method of claim 10, further comprising:
adjusting, by the set of microactuators of the first head gimbal assembly, a position of the first slider in response to receiving power from the microactuator power source; and
performing, by the active component of the first slider, the first drive operation in response to receiving the control signal.

12. The method of claim 10, wherein the control signal is defined by a voltage, and wherein coupling the set of microactuators of the first head gimbal assembly to the microactuator power source is further responsive to determining that the voltage satisfies a threshold voltage.

13. The method of claim 10, wherein the set of microactuators of the first head gimbal assembly is a first set of microactuators, the method further comprising:
receiving, by the first microactuator controller, a control signal from a drive controller; and
electrically coupling, by the first microactuator controller, a second set of microactuators of the first head gimbal assembly to the microactuator power source in response to receiving the control signal.

14. The method of claim 13, wherein coupling the first set of microactuators to the microactuator power source comprises coupling the first set of microactuators to a first output of the microactuator power source, and wherein coupling the second set of microactuators to the microactuator power source comprises coupling the second set of microactuators to a second output of the microactuator power source.

15. A hard disk drive comprising:
a microactuator power source;
a head stack assembly comprising:
a first head gimbal and a second head gimbal assembly, each including:
a slider comprising an active component configured to perform a drive operation;
a set of microactuators; and
a microactuator controller configured to selectively couple the set of microactuators to the microactuator power source; and
a drive controller configured to:
receive a command from a host device:
responsive to receiving the command, output a control signal to the active component of the first head gimbal assembly and the microactuator controller of the first head gimbal assembly, wherein the slider performs the drive operation in response to receiving the control signal, and wherein the microactuator controller of the first head gimbal assembly couples the set of microactuators of the first head gimbal assembly to the microactuator power source in response to receiving the control signal; and
while the outputting the control signal to the microactuator controller of the first head gimbal assembly, refrain from outputting the control signal to active component of the second head gimbal assembly and the microactuator controller of the second head gimbal assembly, wherein the active component of the second head gimbal assembly refrains from performing the drive operation and the microactuator controller of the second head gimbal assembly electrically isolates the set of microactuators of the second head gimbal assembly from the microactuator power source.

* * * * *